United States Patent [19]

Andrews et al.

[11] Patent Number: 5,599,182
[45] Date of Patent: Feb. 4, 1997

[54] ADJUSTABLE THERMAL PROFILE HEATED CRUCIBLE METHOD AND APPARATUS

[75] Inventors: William C. Andrews, Longwood; James K. Nabors, Jr., Apopka, both of Fla.

[73] Assignee: Xothermic, Inc., Apopka, Fla.

[21] Appl. No.: 507,120

[22] Filed: Jul. 26, 1995

[51] Int. Cl.$^6$ ............................................. F27B 14/14
[52] U.S. Cl. .................................... 432/158; 432/18
[58] Field of Search ..................... 432/99, 146, 156, 432/158, 206, 18

[56] References Cited

U.S. PATENT DOCUMENTS

| | | | |
|---|---|---|---|
| 2,673,728 | 3/1954 | Grosskloss | 432/206 |
| 3,459,414 | 8/1969 | Schmidt | 432/158 |
| 4,453,913 | 6/1984 | Gitman | 431/8 |
| 4,801,261 | 1/1989 | Hagar | 431/9 |
| 4,927,349 | 5/1990 | Schirmer et al. | 431/10 |
| 5,013,236 | 5/1991 | Khinkis | 431/10 |
| 5,085,156 | 2/1992 | Dykema | 110/347 |
| 5,158,445 | 10/1992 | Khinkis | 431/10 |
| 5,215,455 | 6/1993 | Dykema | 431/3 |

*Primary Examiner*—Noah P. Kamen
*Attorney, Agent, or Firm*—William M. Hobby, III

[57] ABSTRACT

A heated crucible apparatus allows the adjustment of a thermal profile within a combustion chamber surrounding the crucible by introducing a sub-stoichiometric or a super-stoichiometric mixture of fuel and oxidant into the combustion chamber and varying the oxidant flow for sub-stoichiometric or fuel flow for super-stoichiometric downstream of the initial combustion to control the release of heat in defined areas within the combustion chamber. The adjustable thermal control system allows for an even thermal energy release or varying thermal energy release over the length of the crucible. The apparatus a crucible having an inlet and and outlet surrounded by the combustion chamber which chamber includes an oxidant and fuel supply at the primary injection point followed by secondary injection of the remaining oxidant supply for sub-stoichiometric (or fuel supply for super-stoichiometric) at specific intervals to achieve the desired thermal profile and heating of the crucible. The oxidant and/or fuel stream may be pre-heated to maximize thermal efficiency. The combustion system allows for the use of gaseous, liquid and solid fuels as well as oxidant streams with varying concentrations of oxygen. The crucible has a cooling heat exchanger located adjacent the outlet to control the temperature of materials leaving the crucible.

24 Claims, 1 Drawing Sheet

[5,599,182]

ADJUSTABLE THERMAL PROFILE HEATED CRUCIBLE METHOD AND APPARATUS

BACKGROUND OF THE INVENTION

The present invention relates to a crucible having a combustion chamber therearound for producing an adjustable thermal profile within the combustion chamber to control the crucible temperature.

It is known that the higher the amount of oxygen in an oxidant stream the higher the flame temperature resulting from combustion of the oxidant and fuel. Typically, pure oxygen utilized for stoichiometric combustion will have a higher flame temperature than stoichiometric combustion of the same fuel utilizing air as the oxidant. This situation can lead to localized over heating in the process and failure. The use of oxygen/fuel combustion is difficult when impinging on an alloy that has a melting point well below that of high temperature refractory. Even the use of air/fuel combustion has to be carefully monitored to prevent this localized over heating. It is further known that the combustion of fuel and air results in a high generation of combustion related pollutants than is generated with a similar amount of fuel and oxygen. Therefore it is desirable, when possible, to replace this air stream with oxygen to reduce this pollutant emission without overheating in the process. It is known that substoichiometric or super-stoichiometric combustion occurs at significantly lower temperatures than combustion at stoichiometric rates. Therefore the primary fuel and oxidant are injected in a sub or super stoichiometric ratio, with the oxidant port first followed by the fuel port. When the oxidant is introduced first it creates an oxidizing boundary layer that the fuel injects through and is enclosed by inside the combustion chamber. This region of combustion, in the case of a sub-stoichiometric fuel/oxidant ratio, will generate a low flame temperature to protect the surrounding material. The gas generated from this sub-stoichiometric (excess fuel) combustion is a reform gas of hydrogen, carbon monoxide and minor amounts of methane, water and carbon dioxide. The temperature of the gas will be sufficient to burn readily with any additional oxidant added downstream. By adding the oxidant first and creating an oxidant boundary layer as in the case of 100 percent oxygen, there is no carbon build up due to cracked fuel as it all reacts to form reform gas. In the case of super stoichiometric combustion where there is an excess of oxidant, the resulting gas generated from the primary injection ports will be oxygen, water, carbon dioxide with minor amounts of other species. This gas will also be of sufficient temperature to react rapidly with any fuel injected downstream. By allowing controlled introduction of the remaining oxidant, with sub-stoichiometric combustion, or remaining fuel, with super-stoichiometric combustion, the thermal heat from combustion is allowed to release to the environment of the combustion chamber to prevent localized overheating. Additionally the control of the thermal heat release allows the flexibility to profile the heat release as desired.

Two prior U.S. patents to Dykema, No. 5,215,455 and No. 5,085,156, each teach a combustion process for nitrogen or for sulfur and nitrogen containing fuels where the fuel combustion is provided by staged oxygen in the form of air injected into two or more combustion regions. The first combustion region involves fuel rich stoichiometric conditions under which nitrogen chemically bound in the fuel is substantially converted to molecular nitrogen. The second and final combustion region has at least two stages in which the products from the combustion region are further combusted under a condition of fuel rich stoichiometry and the products from the first stage are combusted at an oxygen/fuel stoichiometric ratio. The prior Schirmer et al. patent, No. 4,927,349, is a method for burning nitrogen containing fuels in a two staged combustion having a rich-lean combustion process which includes introducing the fuel and at least one stream of primary air into the primary combustion region in a fuel air ratio above the stoichiometric ratio to establish a stabilized flame and maintaining the flame in the primary combustion region for a period of time and terminating the primary combustion while introducing at least one stream of secondary air into a secondary region. Two U.S. Patents to Khinkis, No. 5,013,236 and No. 5,158,445, each teach an ultra-low pollutant emission combustion process and apparatus for combusting fossil fuels in an elongated cyclonic primary combustion chamber having a first stage combustion and a secondary combustion chamber having a large amount of fuel with excess air. In the Gitman patent, No. 4,453,913, a recuperative burner has a central burner tube having a rich fuel-air ratio provided to a central burner tube and a lean fuel-air ratio provided to an outer burner tube. The Hagar patent, No. 4,801,261, is for an apparatus and method for delivery of combustion air in multiple zones and has combustion air fed to an ignition zone with other air feeds fed to the outer supplemental zone where the main combustion takes place.

This invention relates to a heated crucible having a combustion process and apparatus that allows the use of oxygen/fuel combustion for an adjustable thermal profile in a combustion chamber surround the crucible and which has low pollutant emissions and which prevents localized overheating in the combustion chamber and in the crucible. In many cases when air/fuel combustion is being utilized the air is pre-heated utilizing the waste flue gas exhaust from the combustion process. The invention can utilize pre-heated oxidant or fuel streams even in the case where 100 percent oxygen is utilized for the oxidant stream. As a result of the low temperature operation of the combustion system, there are no requirements for exotic high temperature materials for the crucible as is normally required when the oxidant stream is 100 percent oxygen.

The following definitions are provided in connection with the present technology and invention. The primary Injection Region is the point where the fuel and a portion of the oxidant is introduced into the combustion chamber. The combustion chamber is the primary chamber that the fuel and oxidant are introduced, mixed and burned. Sub-stoichiometric firing is when more fuel is present than can be reacted to completion by the available oxidant. Super stoichiometric is when more oxidant is present than can be reacted to completion by the available fuel. Reform gas is formed in the process of partial oxidation of a carbonaceous fuel with oxygen from water, carbon dioxide, molecular oxygen or another oxygen rich source to produce carbon monoxide and molecular hydrogen. This occurs without the production and deposition of atomic carbon. Oxygen enrichment is the addition of oxygen to air for the purpose of increasing the oxygen content and reducing the nitrogen content. Downstream is defined as the combustion products exhaust path towards the exit of the exhaust port and may be in a direct line or spaced around the chamber circumference. In the case of a single or multizone unit, each zone begins with a primary injection region and ends with stoichiometric combustion of that zone. Non-stoichiometric is defined as sub or super stoichiometric combustion. Oxidant is defined as that which contains oxygen in any proportion that supports combustion.

SUMMARY OF THE INVENTION

One object of this invention is to provide a heated crucible having a combustion apparatus that has an adjustable temperature profile over the length of the heat release surface without creating localized over heating in the crucible.

Yet another object of the invention is to provide a crucible combustion apparatus with an adjustable fuel/oxidant stream to control the flame temperature thus reducing the need for a crucible made of exotic materials.

A further object of the invention is to utilize oxidants that have low pollution emissions.

Still another object of the invention is a heated crucible having combustion apparatus that is economic to fabricate and operate.

Yet another object of the invention is an apparatus that utilizes pre-heated oxygen or fuel for higher thermal efficiencies in heating a crucible.

A heated crucible has a combustion chamber for the partial combustion of a fuel and an oxidizer is followed by complete combustion with the remaining fuel/oxidant stream that satisfies stoichiometry for the system. The combustion chamber surrounds the crucible and both can be either alloy or refractory material with a primary injection point for the fuel and oxidant (ratio based on sub or super stoichiometry) having a fuel channel for feeding fuel to a fuel port inside the combustion chamber. Prior to the combustion chamber fuel port, an oxidant channel feeds the oxidant to an oxidant port therein, followed downstream by a plurality of secondary injection point for the remainder of the fuel or oxidant (as dictated by the sub or super stoichiometry) to complete stoichiometric combustion. The combustion chamber's primary oxidant injection port precedes the fuel injection port so as to create an oxidant layer against the wall prior to the fuel port and fuel injection. Depending on the use, the injection ports for the primary fuel and oxidant can be either tangential, perpendicular or an intermediate point to the combustion products exhaust path and/or perpendicular or angled to the mean direction of the combustion product exhaust path. Multiple injection ports following the primary injection ports feed the remainder of the oxidant or fuel that are, depending on use, tangential, compound angle tangential or directly perpendicular to the combustion chamber walls. The combustion chamber exhausts into a pre-heater chamber where the oxidant and/or fuel is pre-heated in a heat exchanger prior to injection into their respective combustion chamber ports.

The heated crucible allows the adjustment of a thermal profile within the combustion chamber surrounding the crucible by introducing a sub-stoichiometric or a super-stoichiometric mixture of fuel and oxidant into the combustion chamber and varying the oxidant flow for sub-stoichiometric or fuel flow for super-stoichiometric downstream of the initial combustion to control the release of heat in defined areas within the combustion chamber. The adjustable thermal control system allows for an even thermal energy release or varying thermal energy release over the length of the crucible. The crucible has an inlet and an outlet surrounded by the combustion chamber which chamber having the oxidant and fuel supply at the primary injection point followed by secondary injection of the remaining oxidant supply for sub-stoichiometric (or fuel supply for super-stoichiometric) at specific intervals to achieve the desired thermal profile and heating of the crucible. The oxidant and/or fuel stream may be pre-heated to maximize thermal efficiency. The combustion system allows for the use of gaseous, liquid and solid fuels as well as oxidant streams with varying concentrations of oxygen. The crucible has a cooling heat exchanger located adjacent the outlet to control the temperature of materials leaving the crucible.

BRIEF DESCRIPTION OF THE DRAWINGS

Other objects, features, and advantages of the present invention will be apparent from the written description and the drawings in which.

DETAILED DESCRIPTION OF THE INVENTION

Figure 1:
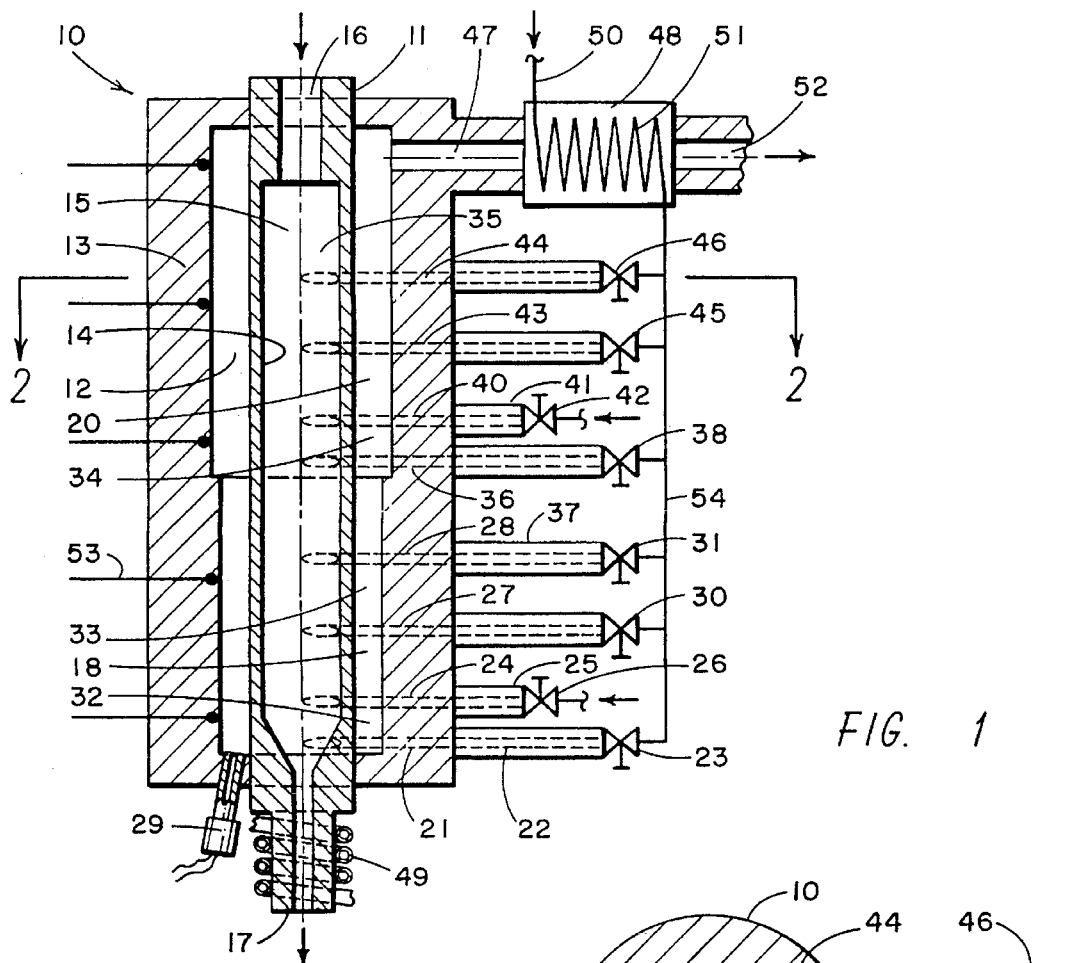
FIG. 1 is a sectional view of a heated crucible having a surrounding combustion chamber in accordance with the present invention.
Figure 2:
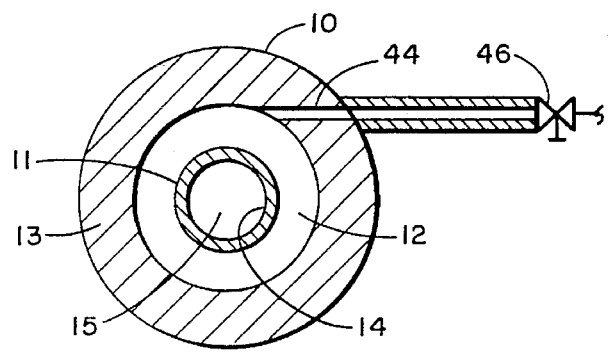
FIG. 2 is a cross section taken on the line 2—2 of FIG. 1 showing tangential inlets.
Figure 3:
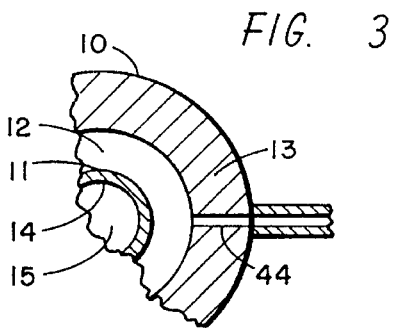
FIG. 3 is a partial cross section of a second embodiment of the present invention having intermediate inlets between tangential and perpendicular.
Figure 4:
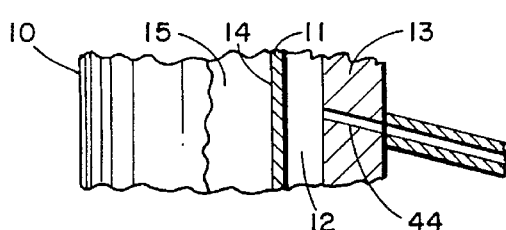
FIG. 4 is a partial cross section of another embodiment of the present invention having perpendicular inlets.
Figure 5:
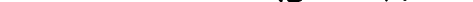
FIG. 5 is a partial sectional view of another embodiment of the present invention having angled inlets.

Referring to the drawings and especially to FIGS. 1 and 2 a sectional view of a heated crucible 10 has a crucible 11 surrounded by a combustion chamber 12 formed by the combustion chamber walls 13. The crucible 11 has walls 14 forming an elongated chamber 15 and has an inlet 16 and an outlet 17. Materials, such as non-metals, including glass, ferrous and non-ferrous metals, such as aluminum, and either virgin or recycled materials can be fed into the crucible 11 inlet 16 where the material is melted in the chamber 15 and flows out the outlet 17. The crucible is heated by the surrounding combustion chamber 12 which heats the crucible in a controlled manner over its length with an adjustable thermal profile combustion providing a uniform or variable heat profile over the length of the crucible. The combustion chamber 12 is illustrated as having two zones, a first zone 18 and a second zone 20 but it will be clear that any number of zones can be used including one zone depending upon the use of the crucible. In the combustion chamber 12, the oxidant enters into the primary oxidant injection port 21 for zone 18 in the chamber walls 13 through a conduit 22 and control valve 23 from an oxidant supply line 54. Fuel, such as natural gas, enters the combustion chamber 12 zone 18 through a fuel inlet 24 from a fuel line 25 having a fuel control valve 26. Only a portion of the oxidant for the combustion chamber 12 is added into the primary injection region of zone 18 to react with the fuel, in a sub-stoichiometric ratio, sufficiently to generate a reform gas composed of carbon monoxide and hydrogen. The primary injection mixture ratios from the primary injection inlets 21 and 24, at the fuel injection/primary oxidant injection point, may vary from 0.05 to 2.0 for sub-stoichiometric oxygen to fuel, or can operate with an oxygen to fuel ratio of from 2.0 to 10.0 for super-stoichiometric oxygen to fuel. A plurality of secondary oxygen injection inlets 27 and 28 for zone 18, each have a control valve 30 for inlet 27 and 31 for inlet 28 controlling the feed of oxygen from the main oxygen supply line 54. The secondary injection points may be oxygen, fuel, air, or a mixture of air and oxygen enrichment. Fuel enters through fuel injection port 21 into the primary injection region 32 for zone 18. All the fuel is injected into the primary injection region 32 for combustion zone 18 where ignition is started with an igniter 29. Both the fuel and oxidant may enter at a tangential angle, as shown in FIG. 2, to the circumference thus spinning about the center of the chamber 12 and against the walls 13 of the chamber and walls 14 of the crucible. The fuel and oxidant may enter the combustion chamber 12 perpendicular as shown in FIG. 4 or at an intermediate angle as shown in FIG. 3 or at an angle as shown in FIG. 5 of the drawings. The remainder of the oxidant for zone 18 to obtain a stoichiometric burn is fed into the inlets 27 and 28 as controlled by the valves 30 and 31. The reform gas generated in the primary injection region 32 of zone 18 of combustion chamber 12 is carried down the sides of the chamber 12 into the secondary injection region 33 of zone 18 where it continues to react with the oxidant injected into the secondary injection region 33.

In the embodiment of FIGS. 1 and 2, a two zone combustion chamber is provided and has a zone 20 having a primary injection region 34 and a secondary injection region 35. In zone 20 of the combustion chamber 12, the oxidant enters into the primary oxidant injection port 36 in the chamber walls 13 through a conduit 37 and control valve 38 from the oxidant supply line 54. Fuel enters the combustion chamber 12 zone 20 through a fuel injection port 40 from a fuel line 41 having a fuel control valve 42. Only a portion of the oxidant for the combustion chamber 12 is added into the primary injection region 34 of zone 20 to react with the fuel, in a sub-stoichiometric ratio, sufficiently to generate a reform gas composed of carbon monoxide and hydrogen in the same manner as in zone 18. A plurality of secondary oxygen injection inlets 43 and 44 for zone 20, each have a control valve 45 for inlet 43 and 46 for inlet 44 controlling the feed of oxygen from the main oxygen supply line 54. Fuel enters through fuel injection port 40 into the primary injection region 34 for zone 20. All the fuel is injected into the primary injection region 34 for combustion zone 20. Both the fuel and oxidant may enter at a tangential angle to the circumference thus spinning about the center of the chamber 12 and against the walls 13 of the chamber and walls 14 of the crucible. The remainder of the oxidant for zone 20 to obtain a stoichiometric burn is fed into the inlets 43 and 44 as controlled by the valves 45 and 46. The reform gas generated in the primary injection region 34 of zone 20 of combustion chamber 12 is carried down the sides of the chamber 12 into the secondary injection region 35 of zone 20 where it continues to react with the oxidant injected into the secondary injection region 35.

The combustion chamber 12 has an outlet 47 feeding through an oxidant preheater chamber 48 which has the input from the oxidant supply 50 fed through the heat exchanger coil 51 and into the oxidant supply line 54. Thus the oxidant is preheated by the exhaust heat from the combustion process taking place in combustion chamber 12 and the cooled exhaust leaves the outlet 52. The injection fluids including the fuel and oxidant can both be pre-heated for efficiency. Pre-heat is based on the process temperature, material selected and fuel used.

The combustion chamber 12 walls 13 have a plurality of spaced temperature sensors 53 placed in the walls for measuring the temperature along the combustion chamber 12 so that the valves 23, 26, 30 and 31 for zone 18 and valves 38, 42, 45 and 46 for zone 20 can be adjusted to provide a thermal profile over the length of the combustion chamber 12 to provide predetermined heating in the crucible 11 along the crucible walls 14 while also providing a stoichiometric burn through the combustion chamber over the length of the chamber. It will of course be clear that the sensors 53 can be used with computer control to automatically control the temperature profile by controlling the valves 23, 26, 30, 31, 38, 42, 45, and 46.

A cooling heat exchanger 49 is shown in FIG. 1 around the outlet 17 of the crucible 11 and may be a water cooled heat exchanger having water flowing through a coil. This is used to cool the melted material leaving the outlet 17 and is useful in connection with glass to control the temperature of the glass flowing from the crucible. This cooling of the glass slows down the flow of the glass from the crucible.

It should be clear at this time that a crucible having a combustion chamber therearound has been provided for producing an adjustable thermal profile within the combustion chamber to control the crucible temperature. However the present invention is not to be considered limited to the embodiments shown which are to be considered illustrative rather than restrictive.

We claim:

1. An adjustable thermal profile continuous material heating apparatus comprising:

a combustion chamber having separate primary combustible reactant component inlets including a fuel inlet and an oxidant inlet for feeding fuel and oxidant combustible reactant components to said combustion chamber with a non-stoichiometric mix of components, said combustion chamber also having a plurality of secondary component inlets located downstream from said primary combustible reactant inlets and spaced in a predetermined spaced relationship to each other for feeding a component of said combustible reactants to said combustion chamber to form a generally stoichiometric combustion in said combustion chamber and to provide a thermal profile for controlling the temperature across said combustion chamber;

a combustion chamber outlet for the exhausting of heat from said combustion chamber; and a crucible located in said combustion chamber and extending generally therethrough and being surrounded by said combustion chamber and having an inlet thereinto and an outlet therefrom for passing materials to be heated therethrough, whereby said crucible can have a profiled temperature along its length for providing a controlled heating of materials passing through said crucible.

2. An adjustable thermal profile continuous material heating apparatus in accordance with claim 1 in which combustion chamber includes a plurality of temperature sensors mounted therein for measuring the temperature in said combustion chamber at a plurality of positions therein and generating a plurality of temperature output signals.

3. An adjustable thermal profile continuous material heating apparatus in accordance with claim 1 in which said crucible outlet has a cooling heat exchanger mounted adjacent thereto to adjust the temperature of the material passing through said crucible outlet.

4. An adjustable thermal profile continuous material heating apparatus in accordance with claim 3 in which said cooling heat exchanger has an oxidant line passing therethrough connected to said primary oxidant inlet to thereby preheat an oxidant being fed to said oxidant primary inlet.

5. An adjustable thermal profile continuous material heating apparatus in accordance with claim 1 in which combustion chamber has a plurality of zones, each zone having a primary fuel inlet and a primary oxidant inlet to feed a non-stoichiometric combination of reactants thereto and said combustion chamber having a plurality of secondary combustible reactant component inlets located downstream from each zone's primary fuel inlet and adjacent primary oxidant inlet and spaced in a predetermined spaced relationship to each other for feeding a combustible reactant component to said combustion chamber to form a plurality of generally stoichiometric combustions in said combustion chamber and to provide a thermal profile for controlling the temperature across said combustion chamber.

6. An adjustable thermal profile continuous material heating apparatus in accordance with claim 5 in which combustion chamber has two zones to form two generally stoichiometric combustion in said combustion chamber and to provide a thermal profile for controlling the temperature across said combustion chamber.

7. An adjustable thermal profile continuous material heating apparatus in accordance with claim 1 in which said combustion chamber is a generally cylindrical combustion chamber and said primary combustion reactant components inlets are generally tangentially mounted inlets.

8. An adjustable thermal profile continuous material heating apparatus in accordance with claim 7 in which at least one of said plurality of secondary combustion reactant component inlets is a generally tangentially mounted combustion chamber inlet.

9. An adjustable thermal profile continuous material heating apparatus in accordance with claim 7 in which at least one of said plurality of secondary combustion reactant component inlets is a generally perpendicularly mounted combustion chamber inlet.

10. An adjustable thermal profile continuous material heating apparatus in accordance with claim 1 in which said combustion chamber is a generally cylindrical combustion chamber and said primary combustion reactant components inlets are generally perpendicular mounted inlets.

11. An adjustable thermal profile continuous material heating apparatus in accordance with claim 1 in which said combustion chamber is a generally cylindrical combustion chamber and said primary combustion reactant components inlets are generally compound angled inlets.

12. An adjustable thermal profile continuous material heating apparatus in accordance with claim 1 in which said crucible is made of a high temperature alloy.

13. An adjustable thermal profile continuous material heating apparatus in accordance with claim 1 in which said crucible is made of a refractory material.

14. An adjustable thermal profile continuous material heating apparatus in accordance with claim 1 in which each said primary and secondary combustible reactant oxidant component inlet is connected to an oxygen line having a control valve positioned therein for controlling the flow of oxygen thereto.

15. An adjustable thermal profile continuous material heating apparatus in accordance with claim 1 in which each said primary combustible reactant fuel component inlet is connected to a fuel line having a control valve positioned therein for controlling the flow of fuel to said combustion chamber.

16. An adjustable thermal profile continuous material heating method comprising the steps:
 selecting a crucible heated by a combustion chamber, said combustion chamber having a primary fuel and a primary oxidant inlet for feeding fuel and oxidant combustible reactant components to the combustion chamber, said combustion chamber also having a plurality of secondary component reactant inlets spaced from said primary fuel and oxidant inlets and in a predetermined spaced relationship to each other and said crucible having an inlet thereinto and an outlet therefrom;
 injecting fuel and oxidant into said combustion chamber through said primary fuel and oxidant inlets in, a predetermined ratio of fuel and oxidant to form a non-stoichiometric combustion reaction;
 igniting said injected primary fuel and oxidant combustible reactants in said combustion chamber; and
 injecting predetermined amounts of one component of said combustible reactants into each of said plurality of secondary component reactant inlets with a combined volume from all of the plurality of spaced secondary reactant component inlets to form a resultant generally stoichiometric combustion to control the temperature in the combustion chamber over an extended area, whereby a thermal combustion profile can be adjusted over a wide range to control the heating of said crucible;
 feeding a material into said crucible inlet for continuous heating of said material as it passes through said crucible; and
 feeding said heated material from said crucible outlet, whereby said crucible can have a profiled temperature along its length for providing a controlled heating of materials passing through said crucible.

17. An adjustable thermal profile continuous material heating method in accordance with claim 16 in which the step of injecting fuel and oxidant through said primary fuel and oxidant inlets includes injecting fuel and oxidant to form a sub-stoichiometric reaction and the step of injecting predetermined amounts of one component of said combustible reactants into each of said plurality of downstream combustion chamber spaced component inlets including injecting a combined volume of oxidant to form a generally stoichiometric combustion to control the temperature in the combustion chamber over an extended area, whereby a thermal combustion profile can be adjusted over a wide range to control the heating of the crucible.

18. An adjustable thermal profile continuous material heating method in accordance with claim 16 in which the step of injecting fuel and oxidant through said primary fuel and oxidant inlets includes injecting fuel and oxidant to form a super-stoichiometric reaction and the step of injecting predetermined amounts of one component of said combustible reactants into each of said plurality of downstream combustion chamber spaced component inlets including injecting a combined volume of fuel to form a generally stoichiometric combustion to control the temperature in the combustion chamber over an extended area, whereby a thermal combustion profile can be adjusted over a wide range to control the heating of the crucible.

19. An adjustable thermal profile continuous material heating method in accordance with claim 16 in which the step of selecting said crucible heated by a combustion chamber includes selecting a combustion chamber having a plurality of spaced apart combustion zones each having primary fuel and oxidant inlets for feeding fuel and oxidant combustible reactants to each of said plurality of zones within the combustion chamber with fuel and oxidant to form a non-stoichiometric reaction and each said combustion chamber zone having a plurality of secondary component reactant inlets located downstream from said primary fuel and oxidant inlets and spaced in a predetermined spaced relationship to each other for feeding a combustible reactant component to said combustion chamber to thereby form a plurality zones, each forming a generally stoichiometric combustion zone in said combustion chamber to thereby provide a thermal profile for controlling the temperature across said combustion chamber.

20. An adjustable thermal profile continuous material heating method in accordance with claim 16 in which the step of selecting a crucible heated by a combustion chamber includes selecting a combustion chamber having a plurality of temperature sensors mounted therein for measuring the temperature in said combustion chamber at a plurality of positions therein.

21. An adjustable thermal profile continuous material heating method in accordance with claim 16 including the step preheating said oxidant with the combustion chamber outlet heat.

22. An adjustable thermal profile continuous material heating method in accordance with claim 16 including the step of cooling the material being discharged from the crucible outlet with a cooling heat exchanger mounted adjacent the crucible outlet.

23. An adjustable thermal profile continuous material heating method in accordance with claim 16 in which the step of selecting a combustion chamber having primary fuel and oxidant inlets includes selecting a generally cylindrical combustion chamber having primary fuel and oxidant inlets positioned generally tangentially to said combustion chamber.

24. An adjustable thermal profile continuous material heating method in accordance with claim 16 in which the step of selecting a combustion chamber having primary fuel and oxidant inlets includes selecting a generally cylindrical combustion chamber having primary fuel and oxidant inlets positioned at a compound angle to said combustion chamber.

* * * * *